May 6, 1930.  P. C. SEEL  1,757,481
PROCESS OF REDUCING THE VISCOSITY OF NITROCELLULOSE
Filed Nov. 6, 1926
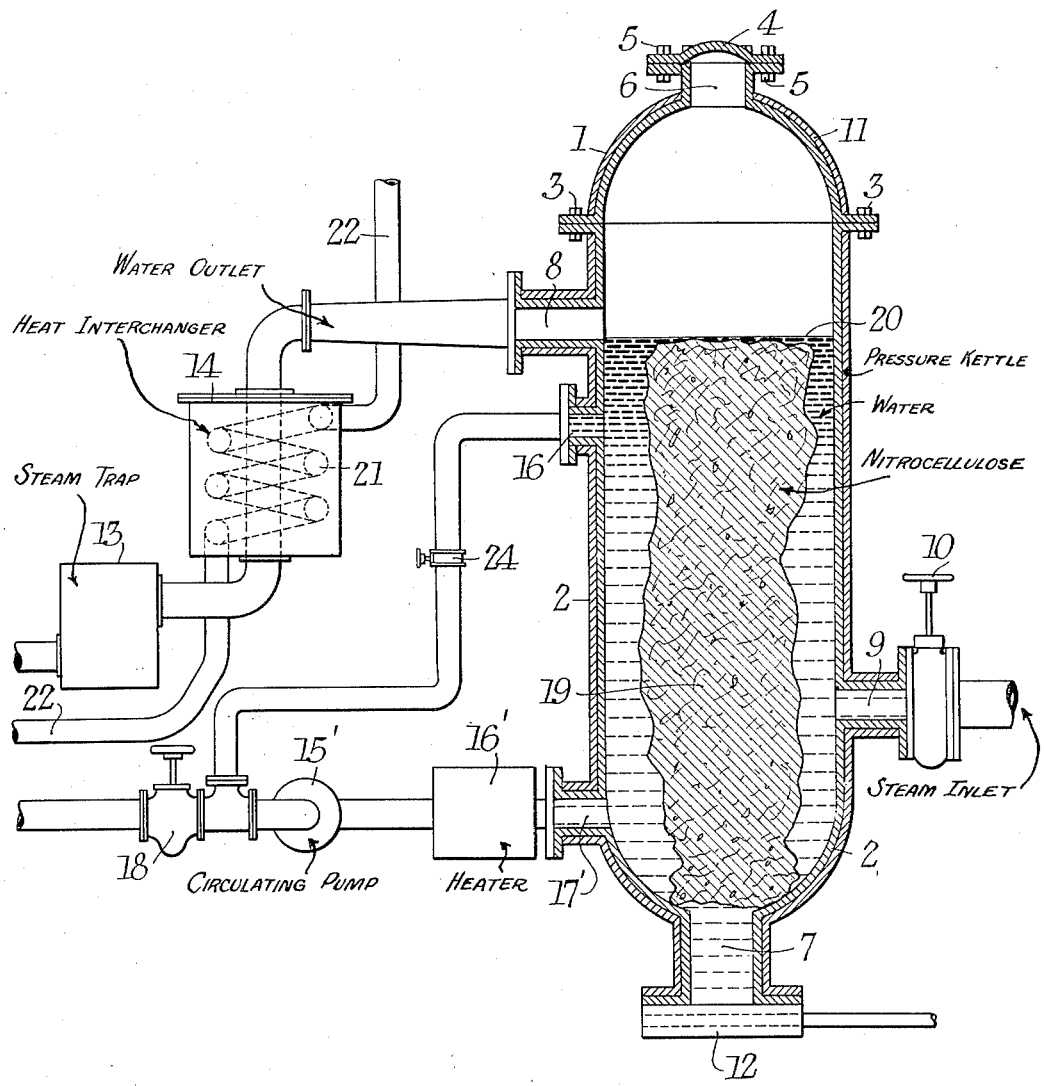
INVENTOR,
Paul C. Seel,
BY
ATTORNEYS.

Patented May 6, 1930

1,757,481

UNITED STATES PATENT OFFICE

PAUL C. SEEL, OF ROCHESTER, NEW YORK, ASSIGNOR TO EASTMAN KODAK COMPANY, OF ROCHESTER, NEW YORK, A CORPORATION OF NEW YORK

PROCESS OF REDUCING THE VISCOSITY OF NITROCELLULOSE

Application filed November 6, 1926. Serial No. 146,867.

This invention relates to an improvement in a method for reducing the viscosity of nitrocellulose. In the treatment of nitrocellulose by boiling under pressure in an autoclave, acid decomposition products are formed after a short time, rendering necessary a special acid resistant lining in the autoclave itself.

I have found that the use of such a lining can be obviated if the watery solution in which the nitrocellulose is being boiled is constantly treated for the neutralization of this acid condition, preferably being maintained in slightly alkaline condition. In my preferred process, the watery solution is pumped into and out of the autoclave itself through a circulatory system into which there is introduced an alkaline material.

The method of carrying out the process will be more clearly understood by reference to the accompanying drawing, in the single figure of which there is a formal showing of the apparatus used, the kettle being shown in section.

A pressure kettle of any desired type may be used. In the form illustrated, it consists of upper and lower flanged sections 1 and 2 connected by bolts 3 with a removable cover 4 held by bolts 5 over the loading opening 6. At the bottom is an unloading nozzle 7 controlled by slide 12. On one side of the kettle is a solution or water outlet 8 and below the level of the outlet 8 is an inlet 9 through which live steam is supplied from a suitable source, not shown, being controlled by valve 10. The kettle is jacketed with a heat insulating layer 11.

The outlet 8 is connected to a steamtrap 13, of any approved form, by which condensed water is withdrawn without allowing the steam to escape, there being in the connection, a heat interchanger 14 which is useful in especially economical operation, the heated coil 21 being connected by tubes 22 to a boiler or the like.

I have found a maintained temperature of 125° C. to give very satisfactory results but contemplate any temperature above 110° C. The upper useful range would be determined by the practical limitations of the apparatus.

The liquid in the pressure kettle is circulated by means of a pump 15', passing through an outlet 16 from the tank, and a heater 16' back to the inlet 17. A hot alkaline solution under pressure may be injected into the system at any point, as by injector valve 18, and this may be used to fill the kettle and also rinse the nitrocellulose, after, before or during cooking.

A stop cock 24 permits the withdrawal of samples of the liquor from the circulating system for test.

An amount of nitrocellulose 19 such as will be completely immersed in the water, the level 20 of which will be determined by the outlet 8, is placed in the kettle. Live steam is introduced at a high temperature, say 140°, below this water line, through the inlet 9, at high temperature and pressure. After the contents are heated to the desired temperature, only a small flow of steam is required to maintain this temperature and to replace the water drawn off. While the heat loss due to this slow withdrawal is not excessive, the heat interchanger will prove economical.

The treatment is maintained until the desired viscosity is attained. While this would, of course, be dependent in part upon the particular materials and conditions employed, I have found a period of 8 to 24 hours under the conditions described to be sufficient.

From time to time during the treatment, tests are made of the acidity of the liquor, and alkaline solution is introduced sufficient to neutralize this. This may comprise any of the usual alkaline solutions such as a 5% aqueous solution of sodium hydroxide. The proportion or amount introduced would, of course, depend on the particular conditions.

Since the water is kept substantially free from acid during the treatment, the necessity for an acid-resistant lining is obviated. The maintenance of the water level above the nitrocellulose is highly desirable. The steam trap permits the withdrawal of the condensate as it forms without reduction of the pressure, and the conditions of treatment are thus maintained uniform and under control at all times and the nitrocellulose is kept covered.

I contemplate as included in my invention such modifications and equivalents as fall within the scope of the appended claims.

In practice, the viscosity of nitrocellulose is well known terminology and universally refers to the viscosity of a given amount of nitrocellulose in a given amount of a suitable solvent. Therefore, both in the specification and claims, where I refer to the viscosity of nitrocellulose, it is to be understood that I am referring to the viscosity of a standard solution containing a standard amount of nitrocellulose.

Having thus described my invention, what I claim as new and desire to secure by Letters Patent is:

1. In the process of reducing the solution viscosity of nitrocellulose that comprises the boiling of the nitrocellulose in water under high pressure and temperature conditions, for a period exceeding eight hours, and in which process the nitrocellulose is maintained completely immersed, and in which process acid products are evolved, the steps of circulating the water through a closed system during such treatment and of introducing into the system from time to time during such treatment an alkaline agent sufficient to maintain the neutrality of the water.

2. In the process of reducing the solution viscosity of nitrocellulose by boiling in water under pressure in an autoclave for at least eight hours, the steps of circulating the water into and out of the autoclave, of introducing into the water from time to time during such circulation an alkaline agent sufficient to maintain the neutrality of the water, and of maintaining the water at a level sufficient to maintain the nitrocellulose immersed therein and of removing any undesired products by the continuous introduction of steam under pressure below the water level and the simultaneous withdrawal of any excess water at such level.

3. In the process of reducing the solution viscosity of nitrocellulose that comprises completely immersing a quantity of nitrocellulose in water under high pressure and temperature conditions for at least eight hours and maintaining the water at a level sufficient to immerse the nitrocellulose during such period by the introduction of steam under pressure beneath the water level and the simultaneous withdrawal of condensed and injected liquid at such level, the step of circulating the water through a closed system during such period and of introducing into such system from time to time during such period an amount of an alkaline agent sufficient to maintain the neutrality of the water.

4. In the process of reducing the solution viscosity of nitrocellulose by boiling in water under pressure in an autoclave, for at least eight hours, the steps of circulating the water into and out of the autoclave, and injecting from time to time into the water stream an alkaline agent.

5. In the process of reducing the solution viscosity of nitrocellulose by boiling in water under high pressure and temperature in an autoclave, for a period of eight to twenty-four hours, in which acid reaction products are evolved, the steps of injecting into the circulating water stream sufficient quantities of an alkaline agent to maintain the neutrality of the reaction mixture.

Signed at Rochester, New York, this 28th day of October, 1926.

PAUL C. SEEL.